US012696115B2

(12) United States Patent
Yang et al.

(10) Patent No.: US 12,696,115 B2
(45) Date of Patent: *Jul. 28, 2026

(54) TRANSMITTER-BASED LINK ADAPTATION

(71) Applicant: QUALCOMM Incorporated, San Diego, CA (US)

(72) Inventors: Lin Yang, San Diego, CA (US); Bin Tian, San Diego, CA (US); Stephen Jay Shellhammer, Ramona, CA (US); Dung Ngoc Doan, San Diego, CA (US); Sameer Vermani, San Diego, CA (US); Jialing Li Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/465,804

(22) Filed: Sep. 12, 2023

(65) Prior Publication Data

US 2024/0080690 A1 Mar. 7, 2024

Related U.S. Application Data

(63) Continuation of application No. 17/092,702, filed on Nov. 9, 2020, now Pat. No. 11,805,431.

(Continued)

(51) Int. Cl.
*H04W 24/08* (2009.01)
*H04L 27/26* (2006.01)
*H04W 84/12* (2009.01)

(52) U.S. Cl.
CPC ......... *H04W 24/08* (2013.01); *H04L 27/2627* (2013.01); *H04W 84/12* (2013.01)

(58) Field of Classification Search
CPC .. H04W 24/08; H04W 84/12; H04L 27/2627; H04L 27/2646; H04L 1/0009;
(Continued)

(56) References Cited

U.S. PATENT DOCUMENTS 10,181,927 B2 * 1/2019 Lim ...................... H04L 1/0003
10,219,285 B2 * 2/2019 Nabetani .............. H04B 7/0452
(Continued)

FOREIGN PATENT DOCUMENTS

CN 105027461 A 11/2015
TW 201911781 A 3/2019
(Continued)

OTHER PUBLICATIONS

Taiwan Search Report—TW109139140—TIPO—Jan. 15, 2024.
(Continued)

*Primary Examiner* — Kevin T Bates
*Assistant Examiner* — Hector Reyes
(74) *Attorney, Agent, or Firm* — Holland & Hart LLP

(57) ABSTRACT

This disclosure provides methods, devices and systems for link adaptation in wireless communications. Some implementations more specifically relate to transmitter-based modulation and coding scheme (MCS) selection. A transmitting device transmits a test packet, over a wireless channel, to a receiving device. The receiving device generates one or more signal-to-interference-plus-noise ratio (SINR) estimates for the wireless channel based on the received sounding packet. In some aspects, each SINR estimate may be associated with a particular modulation order. In some other aspects, each SINR estimate may be generated based on a transmitter configuration or a receiver type to be used for subsequent communications between the transmitting device and the receiving device. The receiving device transmits feedback, including the SINR estimates, to (Continued)

the transmitting device. The transmitting device then selects an MCS to be used for subsequent communications with the receiving device based on the SINR estimates and associated modulation orders.

18 Claims, 13 Drawing Sheets

Related U.S. Application Data

(60) Provisional application No. 62/939,433, filed on Nov. 22, 2019.

(58) Field of Classification Search
CPC ..... H04L 1/0025; H04L 1/206; H04L 1/0003; H04L 1/0026; H04B 7/0408; H04B 7/0452; H04B 7/0632
See application file for complete search history.

(56) References Cited

U.S. PATENT DOCUMENTS

| | | | |
|---|---|---|---|
| 2003/0095506 A1 | 5/2003 | Jalali et al. | |
| 2007/0104087 A1* | 5/2007 | Tee | H04B 17/24 370/208 |
| 2008/0273624 A1* | 11/2008 | Kent | H04B 7/0632 375/296 |
| 2009/0067557 A1 | 3/2009 | Zhengang et al. | |
| 2009/0274204 A1* | 11/2009 | Chen | H04L 27/2601 375/228 |
| 2010/0284454 A1* | 11/2010 | Oteri | H03M 13/353 375/224 |
| 2011/0211657 A1 | 9/2011 | Cho et al. | |
| 2012/0099446 A1* | 4/2012 | Su | H04L 1/0003 370/252 |
| 2013/0021931 A1* | 1/2013 | Kim | H04L 1/0026 370/252 |
| 2014/0204857 A1* | 7/2014 | Mallik | H04L 25/0328 370/329 |
| 2014/0341048 A1 | 11/2014 | Sajadieh et al. | |
| 2015/0230118 A1* | 8/2015 | Lim | H04L 27/10 370/252 |
| 2016/0065257 A1 | 3/2016 | Fujii | |
| 2016/0261327 A1 | 9/2016 | Merlin et al. | |
| 2016/0262167 A1 | 9/2016 | Lan et al. | |
| 2017/0033898 A1 | 2/2017 | Chun et al. | |
| 2017/0141886 A1* | 5/2017 | Chung | H04L 5/006 |
| 2018/0035426 A1* | 2/2018 | Barriac | H04L 5/0055 |
| 2019/0097750 A1* | 3/2019 | Sandberg | H04L 1/0035 |
| 2021/0160713 A1 | 5/2021 | Yang et al. | |

FOREIGN PATENT DOCUMENTS

| | | |
|---|---|---|
| TW | 201924379 A | 6/2019 |
| WO | 2016140877 A1 | 9/2016 |

OTHER PUBLICATIONS

International Preliminary Report on Patentability—PCT/US2020/059790 The International Bureau of WIPO—Geneva, Switzerland, Jun. 2, 2022.

International Search Report and Written Opinion—PCT/US2020/059790—ISA/EPO—Feb. 16, 2021.

Rico-Alvarino A., et al., "Learning-Based Adaptive Transmission for Limited Feedback Multiuser MIMO-OFDM," IEEE Transactions on Wireless Communications, Jul. 1, 2014, vol. 13, No. 7, pp. 3806-3820, XP011553200, ISSN: 1536-1276, DOI: 10.1109/TWC.2014.2314104 [retrieved on Jul. 8, 2014] Section II; p. 3808 figure 1.

Taiwan Search Report—TW113142847—TIPO—Feb. 17, 2025.

Taiwan Search Report—TW113142847—TIPO—Jul. 30, 2025.

Rico-Alvarino A., et al., "Learning-Based Adaptive Transmission for Limited Feedback Multiuser MIMO-OFDM", IEEE Transactions on Wireless Communications, vol. 13, No. 7, Jul. 2014, Apr. 11, 2014, pp. 3806-3820.

Srinivasan R., et al., "IEEE 802.16m Evaluation Methodology Document (EMD)", IEEE 802.16m-08/004r4, Nov. 26, 2008, pp. 1-195.

* cited by examiner

500

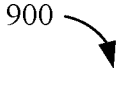

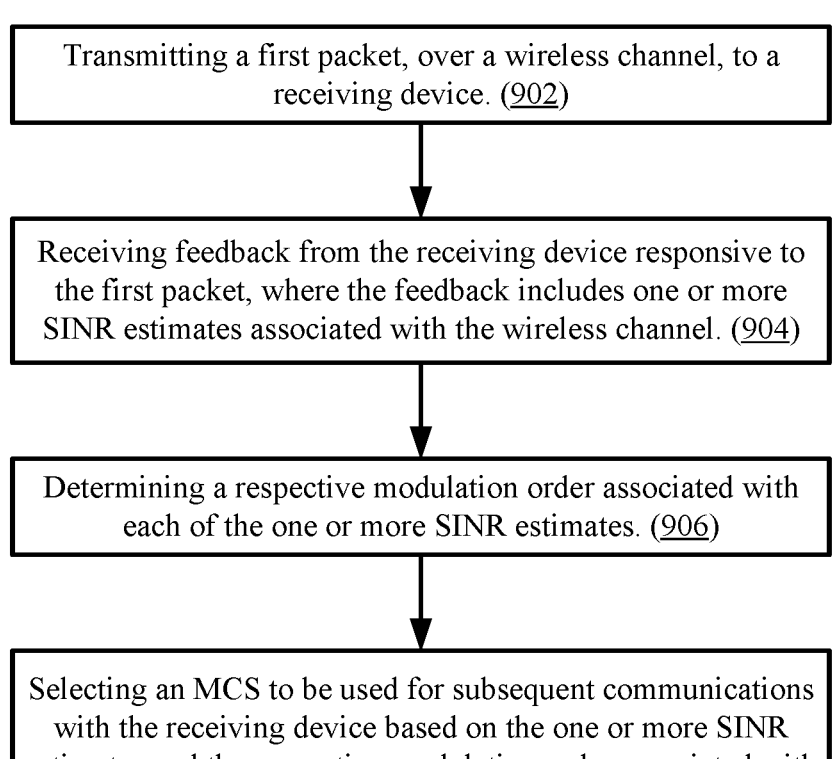

Transmitting a first packet, over a wireless channel, to a receiving device. (902)

Receiving feedback from the receiving device responsive to the first packet, where the feedback includes one or more SINR estimates associated with the wireless channel. (904)

Determining a respective modulation order associated with each of the one or more SINR estimates. (906)

Selecting an MCS to be used for subsequent communications with the receiving device based on the one or more SINR estimates and the respective modulation order associated with each of the one or more SINR estimates. (908)

*Figure 9*

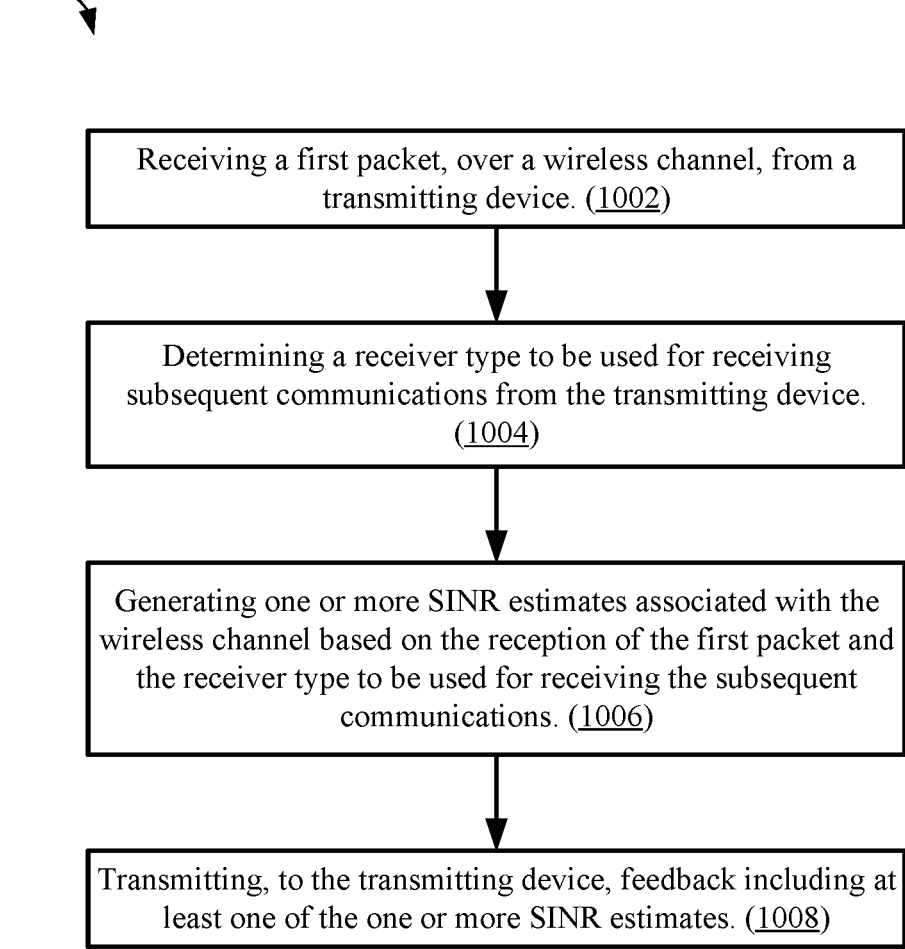

1000

Receiving a first packet, over a wireless channel, from a transmitting device. (1002)

Determining a receiver type to be used for receiving subsequent communications from the transmitting device. (1004)

Generating one or more SINR estimates associated with the wireless channel based on the reception of the first packet and the receiver type to be used for receiving the subsequent communications. (1006)

Transmitting, to the transmitting device, feedback including at least one of the one or more SINR estimates. (1008)

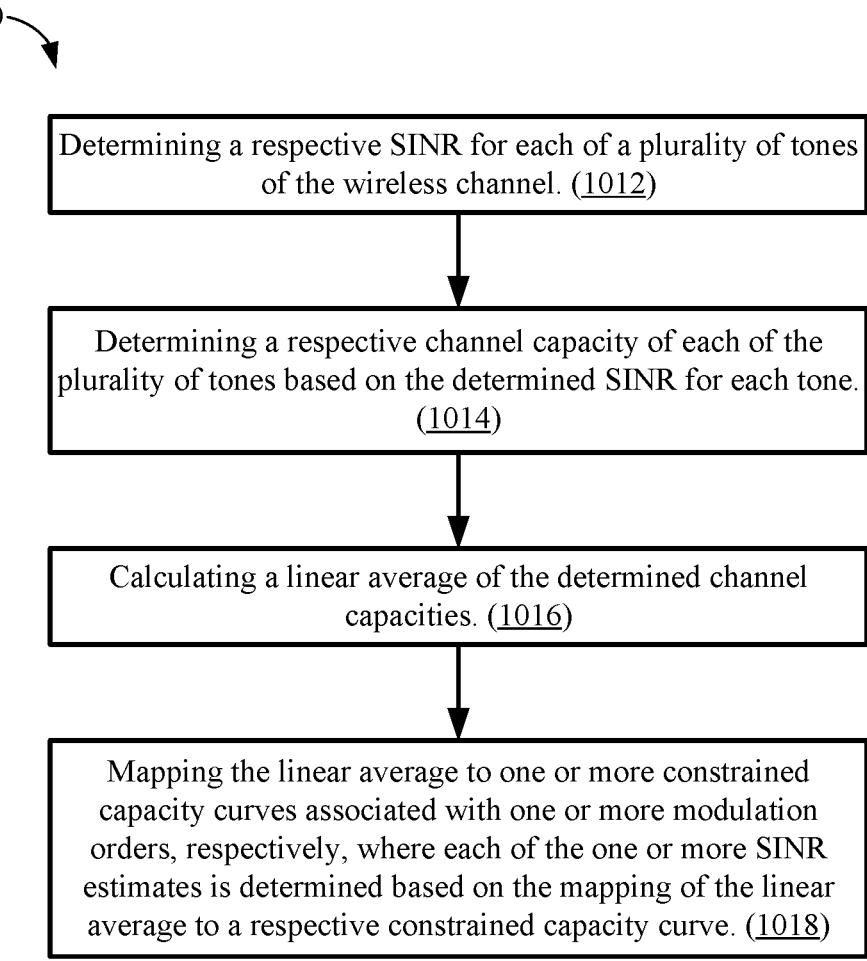

Determining a respective SINR for each of a plurality of tones of the wireless channel. (1012)

Determining a respective channel capacity of each of the plurality of tones based on the determined SINR for each tone. (1014)

Calculating a linear average of the determined channel capacities. (1016)

Mapping the linear average to one or more constrained capacity curves associated with one or more modulation orders, respectively, where each of the one or more SINR estimates is determined based on the mapping of the linear average to a respective constrained capacity curve. (1018)

TRANSMITTER-BASED LINK ADAPTATION

CROSS-REFERENCE TO RELATED APPLICATIONS

This patent application is a Continuation of U.S. Non-Provisional patent application Ser. No. 17/092,702 entitled "TRANSMITTER-BASED LINK ADAPTATION" and filed on Nov. 9, 2020, which claims priority to U.S. Provisional Patent Application No. 62/939,433 entitled "TRANSMITTER-BASED LINK ADAPTATION" and filed on Nov. 22, 2019, which is assigned to the assignee hereof. The disclosure of the prior applications are considered part of and are incorporated by reference in this patent application.

TECHNICAL FIELD

This disclosure relates generally to wireless communication, and more specifically, to transmitter-based link adaptation in wireless communication systems.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Imperfect channel conditions on the wireless communication medium may cause data loss during wireless data transmissions from a transmitting device to a receiving device. If the receiving device does not receive (or cannot decode) one or more portions of the transmitted data, the transmitting device may retransmit the one or more portions of data until received and properly decoded by the receiving device. Data retransmissions may consume time and limited resources of the wireless communication medium, and therefore it is desirable to minimize the number of such data retransmissions.

Link adaptation is a technique for adapting the modulation, coding, or other signaling parameters to the channel conditions on the wireless medium. An optimized modulation and coding scheme (MCS) may help reduce retransmissions on the wireless medium. In an example technique for determining channel conditions, the transmitting device transmits "sounding" packets, over the wireless medium, to the receiving device. The receiving device estimates the channel conditions based on the received sounding packets, and feeds back channel state information (CSI) to the transmitting device. The transmitting device selects an MCS to be used for subsequent data transmissions to the receiving device based on the CSI. Thus, optimal MCS selection may depend on the detail and accuracy of the CSI reported by the receiving device.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include transmitting a first packet, over a wireless channel, to a receiving device; receiving feedback from the receiving device responsive to the first packet, where the feedback includes one or more signal-to-interference-plus-noise ratio (SINR) estimates associated with the wireless channel; determining a respective modulation order associated with each of the one or more SINR estimates; and selecting a modulation and coding scheme (MCS) to be used for subsequent communications with the receiving device based on the one or more SINR estimates and the respective modulation order associated with each of the one or more SINR estimates.

In some implementations, the feedback includes information indicating the modulation order associated with each of the one or more SINR estimates. In some implementations, the method further includes transmitting a second packet to the receiving device in accordance with the selected MCS, where the second packet is transmitted over a number (N) of spatial streams. In some aspects, the first packet may be transmitted over the N spatial streams. In some other aspects, the first packet may be transmitted over a different number (M) of spatial streams than the second packet. In some implementations, the method further includes transmitting a third packet to the receiving device prior to the transmission of the first packet, the third packet carrying information indicating the N spatial streams. In some implementations, the first packet is a null data packet (NDP) and the third packet is an NDP announcement (NDPA) associated with the NDP.

In some implementations, the one or more SINR estimates includes a plurality of SINR estimates, where each of the plurality of SINR estimates is associated with a different modulation order. In some implementations, the determining of the modulation order includes determining an arrangement of the plurality of SINR estimates in the received feedback, the modulation order associated with each SINR estimate being determined based on the arrangement of the plurality of SINR estimates. In some implementations, the selecting of the MCS includes estimating a respective throughput of communications associated with each of the plurality of SINR estimates based on the modulation order associated with each SINR estimate, the MCS being selected based on the estimated throughputs associated with the plurality of SINR estimates.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including transmitting a first packet, over a wireless channel, to a receiving device; receiving feedback from the receiving device responsive to the first packet, where the feedback includes one or more SINR estimates associated with the wireless channel; determining a respective modulation order associated with each of the one or more SINR estimates; and selecting an MCS to be used for subsequent communications with the receiving device based on the one or more SINR estimates and the respective modulation order associated with each of the one or more SINR estimates.

Another innovative aspect of the subject matter described in this disclosure can be implemented as a method of wireless communication. The method may be performed by a wireless communication device, and may include receiving a first packet, over a wireless channel, from a transmitting device; determining a receiver type to be used for receiving subsequent communications from the transmitting device; generating one or more SINR estimates associated with the wireless channel based on the reception of the first packet and the receiver type to be used for receiving the subsequent communications; and transmitting, to the transmitting device, feedback including at least one of the one or more SINR estimates.

In some implementations, the receiver type is a minimum mean square error (MMSE) receiver type or a maximum likelihood (ML) receiver type. In some implementations, the generating of the one or more SINR estimates includes determining a respective SINR for each of a plurality of tones of the wireless channel; determining a respective channel capacity of each of the plurality of tones based on the determined SINR for each tone; calculating a linear average of the determined channel capacities; and mapping the linear average to one or more constrained capacity curves associated with one or more modulation orders, respectively, where each of the one or more SINR estimates is determined based on the mapping of the linear average to a respective constrained capacity curve.

In some implementations, the feedback further includes information indicating a respective modulation order associated with each of the one or more SINR estimates. In some implementations, the one or more SINR estimates includes a plurality of SINR estimates, where each of the plurality of SINR estimates is associated with a different modulation order. In some aspects, the method may further include estimating a respective throughput of communications associated with each of the plurality of SINR estimates based on the modulation order associated with each SINR estimate; and selecting one of the plurality of SINR estimates to be included in the feedback based on the estimated throughput associated with each of the plurality of SINR estimates. In some other aspects, the feedback may include the plurality of SINR estimates. In some implementations, the method further includes arranging the plurality of SINR estimates, in the feedback, according to the modulation order associated with each SINR estimate.

In some implementations, the method further includes receiving a second packet from the transmitting device prior to receiving the first packet, where the second packet carries information indicating a number of spatial streams associated with the subsequent communications; and adjusting each of the one or more SINR estimates based on the number of spatial streams associated with the subsequent communications. In some implementations, the first packet is an NDP and the second packet is an NDPA associated with the NDP.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including receiving a first packet, over a wireless channel, from a transmitting device; determining a receiver type to be used for receiving subsequent communications from the transmitting device; generating one or more SINR estimates associated with the wireless channel based on the reception of the first packet and the receiver type to be used for receiving the subsequent communications; and transmitting, to the transmitting device, feedback including at least one of the one or more SINR estimates.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 9 shows a flowchart illustrating an example process for wireless communication that supports transmitter-based link adaptation according to some implementations.

FIG. 10A shows a flowchart illustrating an example process for wireless communication that supports transmitter-based link adaptation according to some implementations.

FIG. 10B shows a flowchart illustrating an example process for wireless communication that supports transmitter-based link adaptation according to some implementations.

Like reference numbers and designations in the various drawings indicate like elements.

DETAILED DESCRIPTION

Figure 1:
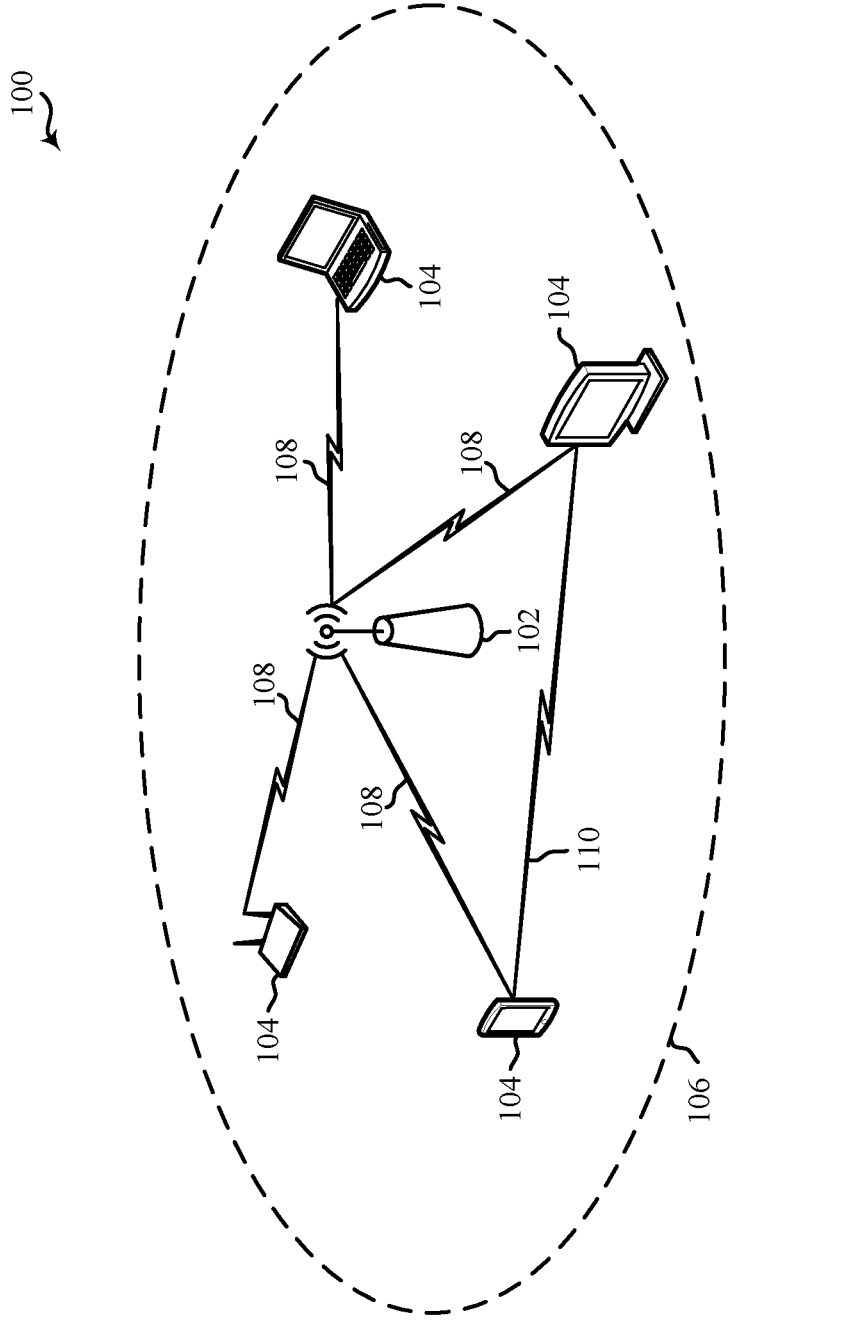
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various aspects relate generally to link adaptation in wireless communication systems, and more particularly, to transmitter-based modulation and coding scheme (MCS) selection. In some aspects, a transmitting device may transmit a test packet, such as a sounding packet, over a wireless channel to a receiving device. The receiving device may generate multiple signal-to-interference-plus-noise ratio (SINR) estimates for the wireless channel based on the received test packet. In some aspects, each SINR estimate may be associated with a particular respective modulation order selected from a set of multiple possible modulation orders (such as BPSK, QPSK, or M-QAM). In some other aspects, each SINR estimate may be generated based on a transmitter configuration (such as a number of spatial streams) or a receiver type (such as MMSE or ML) to be used by the transmitting device and the receiving device, respectively, for subsequent communications. The receiving device may then transmit feedback to the transmitting device that includes at least one of the SINR estimates associated with a particular respective modulation order. In some implementations, the receiving device may transmit multiple or all of the SINR estimates to the transmitting device. The transmitting device may then select an MCS to be used for subsequent communications with the receiving device based on the one or more SINR estimates and the respective modulation orders.

Particular implementations of the subject matter described in this disclosure can be implemented to realize one or more of the following potential advantages. In some implementations, the described techniques can be used to improve the data rate and throughput of communications over a wireless channel. By determining the modulation order associated with each SINR estimate reported by the receiving device, the transmitting device can make a more informed MCS selection based on the current channel conditions. For example, the transmitting device may select an MCS based on the reported SINR estimate and the associated modulation order that yields the largest throughput for the current channel conditions. Further, by adjusting the SINR estimates based on the transmitter configuration or receiver type to be used for subsequent communications (and not just at the time of channel sounding), the receiving device may ensure that the reported SINR estimates are relevant to the data transmission for which they are intended. Accordingly, aspects of the present disclosure enable the transmitting device to select an MCS that is more closely tailored for the channel conditions and device configurations at the time data is transmitted to the receiving device.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple channels (which may be used as subchannels of a larger bandwidth channel as described below). For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels (which may be referred to as subchannels).

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a first portion (or "legacy preamble") and a second portion (or "non-legacy preamble"). The first portion may be used for packet detection, automatic gain control and channel estimation, among other uses. The first portion also may generally be used to maintain compatibility with legacy devices as well as non-legacy devices. The format of, coding of, and information provided in the second portion of the preamble is based on the particular IEEE 802.11 protocol to be used to transmit the payload.

Figure 2:
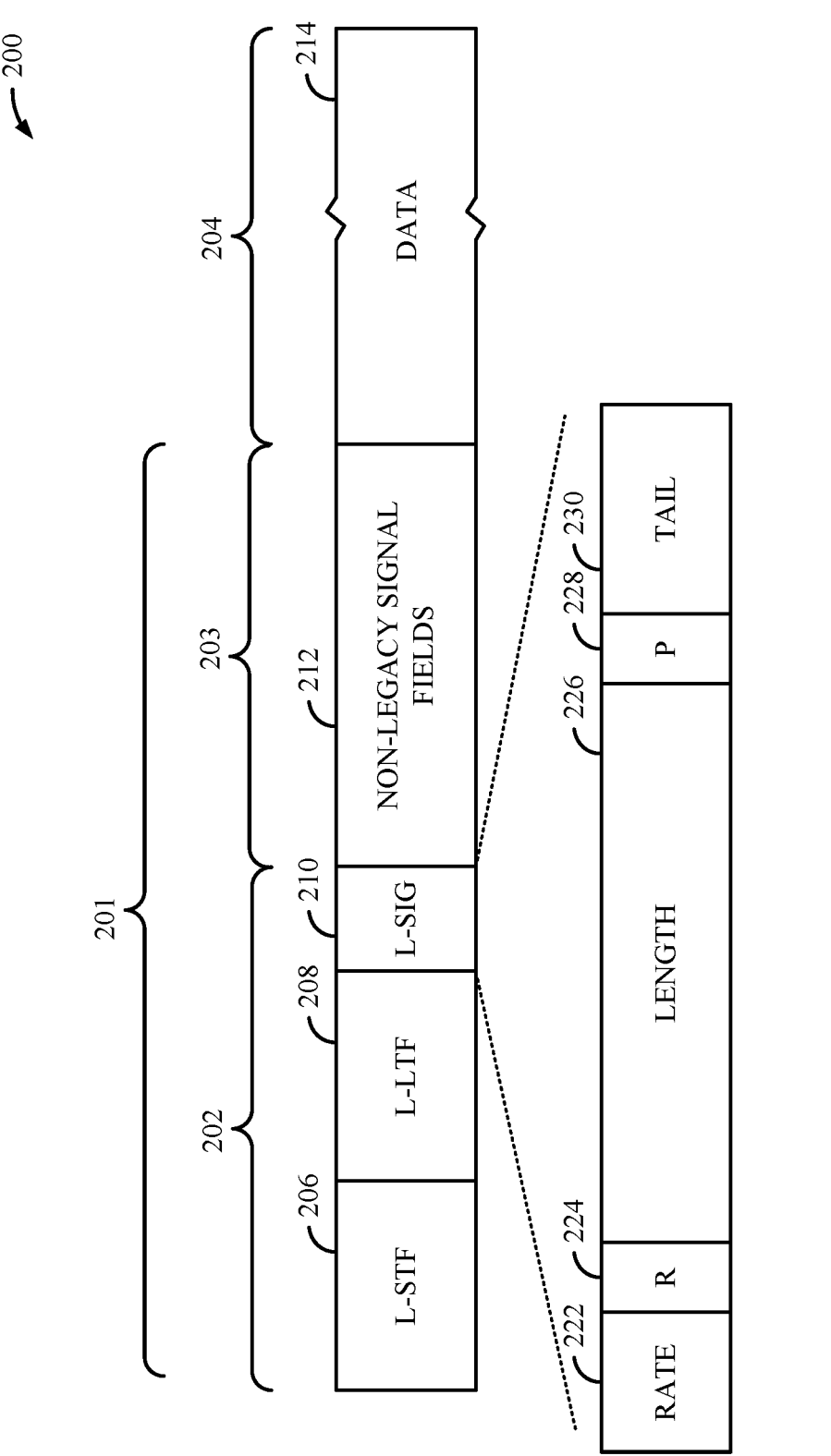
FIG. 2 shows an example protocol data unit (PDU) usable for communications between an access point (AP) and a number of stations (STAs).

FIG. 2 shows an example protocol data unit (PDU) 200 usable for wireless communication between an AP and a number of STAs. For example, the PDU 200 can be configured as a PPDU. As shown, the PDU 200 includes a PHY preamble 201 and a PHY payload 204. For example, the preamble 201 may include a first portion 202 that itself includes a legacy short training field (L-STF) 206, which may consist of two BPSK symbols, a legacy long training field (L-LTF) 208, which may consist of two BPSK symbols, and a legacy signal field (L-SIG) 210, which may consist of one BPSK symbol. The first portion 202 of the preamble 201 may be configured according to the IEEE 802.11a wireless communication protocol standard. The preamble 201 may also include a second portion 203 including one or more non-legacy signal fields 212, for example, conforming to an IEEE wireless communication protocol such as the IEEE 802.11ac, 802.11ax, 802.11be or later wireless communication protocol standards.

L-STF 206 generally enables a receiving device to perform automatic gain control (AGC) and coarse timing and frequency estimation. L-LTF 208 generally enables a receiving device to perform fine timing and frequency estimation and also to perform an initial estimate of the wireless channel. L-SIG 210 generally enables a receiving device to determine a duration of the PDU and to use the determined duration to avoid transmitting on top of the PDU. For example, L-STF 206, L-LTF 208 and L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

FIG. 2 also shows an example L-SIG 210 in the PDU 200. L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figures 3A, 3B:
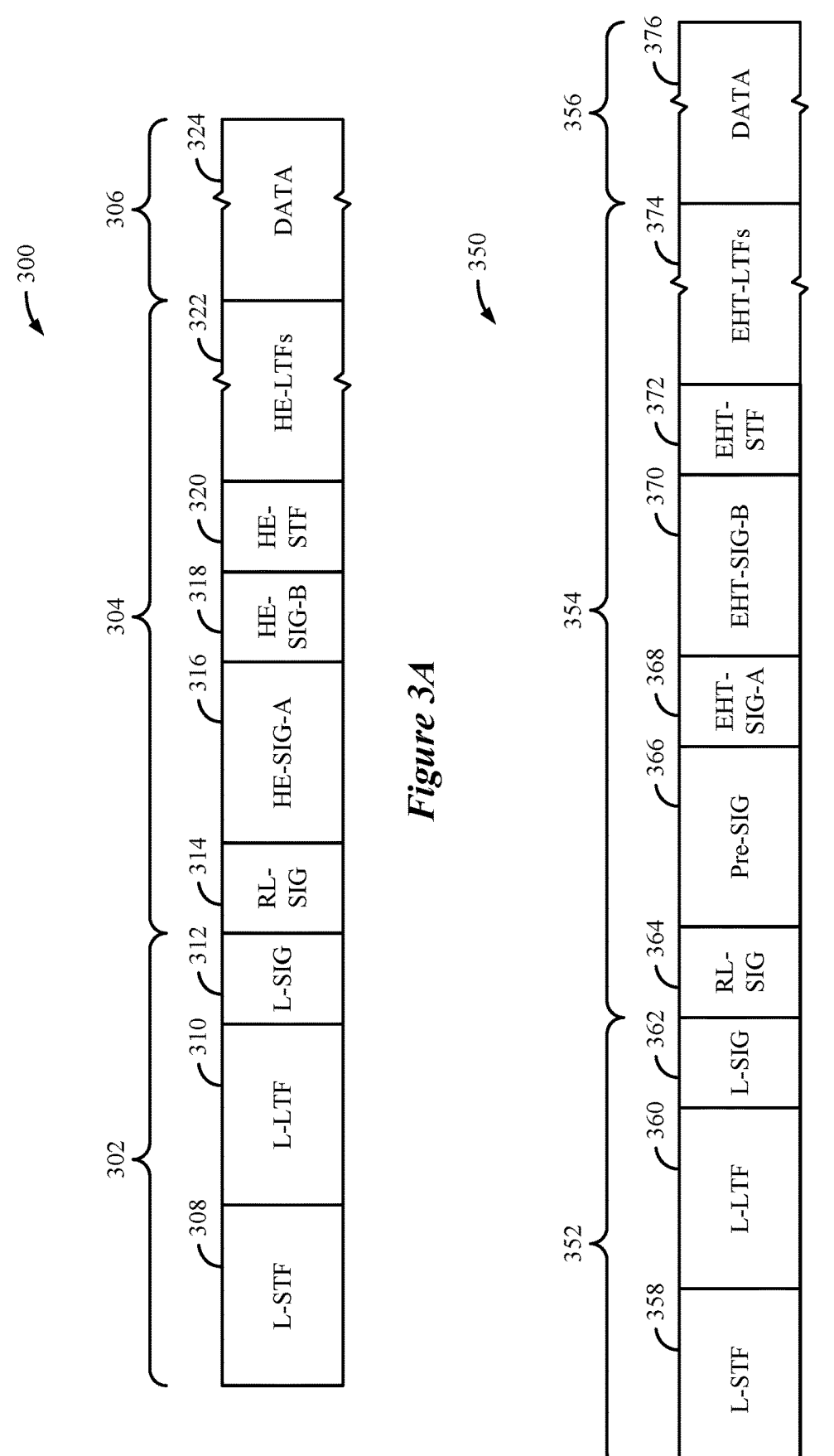
FIG. 3A shows an example physical layer (PHY) preamble usable for communications between an AP and each of a number of STAs.
FIG. 3B shows another example PHY preamble usable for communications between an AP and each of a number of stations.

FIG. 3A shows another example PDU 300 usable for wireless communication between an AP and a number of STAs. The PDU 300 may be used for MU-OFDMA or MU-MIMO transmissions. The PDU 300 includes a PHY preamble including a first portion 302 and a second portion 304. The PDU 300 may further include a PHY payload 306 after the preamble, for example, in the form of a PSDU including a DATA field 324. The first portion 302 includes L-STF 308, L-LTF 310, and L-SIG 312. The second portion 304 of the preamble and the DATA field 324 may be formatted as a High Efficiency (HE) WLAN preamble and frame, respectively, in accordance with the IEEE 802.11ax amendment to the IEEE 802.11 wireless communication protocol standard. The second portion 304 includes a repeated legacy signal field (RL-SIG) 314, a first HE signal field (HE-SIG-A) 316, a second HE signal field (HE-SIG-B) 318 encoded separately from HE-SIG-A 316, an HE short training field (HE-STF) 320 and a number of HE long training fields (HE-LTFs) 322. Like L-STF 308, L-LTF 310, and L-SIG 312, the information in RL-SIG 314 and HE-SIG-A 316 may be duplicated and transmitted in each of the component 20 MHz subchannels in instances involving the use of a bonded channel. In contrast, HE-SIG-B 318 may be unique to each 20 MHz subchannel and may target specific STAs 104.

RL-SIG 314 may indicate to HE-compatible STAs 104 that the PPDU is an HE PPDU. An AP 102 may use HE-SIG-A 316 to identify and inform multiple STAs 104 that the AP has scheduled UL or DL resources for them. HE-SIG-A 316 may be decoded by each HE-compatible STA 104 served by the AP 102. HE-SIG-A 316 includes information usable by each identified STA 104 to decode an associated HE-SIG-B 318. For example, HE-SIG-A 316 may indicate the frame format, including locations and lengths of HE-SIG-Bs 318, available channel bandwidths, and modulation and coding schemes (MCSs), among other possibilities. HE-SIG-A 316 also may include HE WLAN signaling information usable by STAs 104 other than the number of identified STAs 104.

HE-SIG-B 318 may carry STA-specific scheduling information such as, for example, per-user MCS values and per-user RU allocation information. In the context of DL MU-OFDMA, such information enables the respective STAs 104 to identify and decode corresponding RUs in the associated data field. Each HE-SIG-B 318 includes a common field and at least one STA-specific ("user-specific") field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other possibilities. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields (which may be followed by padding). Each user block field may include two user fields that contain information for two respective STAs to decode their respective RU payloads in DATA field 324.

FIG. 3B shows another example PHY preamble usable for communications between an AP and each of a number of stations. The PPDU 350 may be used for SU, MU-OFDMA or MU-MIMO transmissions. The PPDU 350 includes a PHY preamble including a legacy portion 352 and a non-legacy portion 354. The PPDU 350 may further include a PHY payload 356 after the preamble, for example, in the form of a PSDU including a DATA field 376. The legacy portion 352 includes L-STF 358, L-LTF 360, and L-SIG 362. The non-legacy portion 354 of the preamble and the DATA field 376 may be formatted as an Extreme High Throughput (EHT) WLAN preamble and frame, respectively, in accordance with the IEEE 802.11be amendment to the IEEE 802.11 wireless communication protocol standard, or may be formatted as a preamble and frame, respectively, conforming to any later (post-HE) version of a new wireless communication protocol conforming to a future IEEE 802.11 wireless communication protocol standard or other standard.

The non-legacy portion 354 of the preamble includes a second signal field (referred to herein as "Pre-SIG") 366, a third signal field (referred to herein as "EHT-SIG-A" although it may be structured as, and carry version-dependent information for, other wireless communication protocol versions beyond EHT) 368, and a fourth signal field (referred to herein as "EHT-SIG-B" although it may be structured as, and carry version-dependent information for, other wireless communication protocol versions beyond EHT) 370. The non-legacy portion 354 further includes an additional short training field (referred to herein as "EHT-STF" although it may be structured as, and carry version-dependent information for, other wireless communication protocol versions beyond EHT) 372 and a number of additional long training fields (referred to herein as "EHT-LTFs" although they may be structured as, and carry version-dependent information for, other wireless communication protocol versions beyond EHT) 374. Like L-STF 358, L-LTF 360, and L-SIG 362, the information in Pre-SIG 366 and EHT-SIG-A 368 may be duplicated and transmitted in each of the component 20 MHz channels in instances involving the use of a bonded channel. In some implementations, EHT-SIG-A 368 may additionally or alternatively carry information in one or more non-primary 20 MHz channels that is different than the information carried in the primary 20 MHz channel. EHT-SIG-B 370 may be unique to each 20 MHz channel and, as described above, may target specific STAs 104. The non-legacy portion 354 of the preamble may or may not include a repeated legacy signal field (RL-SIG) 364 after L-SIG 362 and before Pre-SIG 366.

EHT-SIG-A 368 may include one or more jointly encoded symbols and may be encoded in a different block from the block in which Pre-SIG 366 is encoded. EHT-SIG-A 368 may be used by an AP to identify and inform multiple STAs 104 that the AP has scheduled UL or DL resources. EHT-SIG-A 368 may be decoded by each compatible STA 104 served by the AP 102. EHT-SIG-A 368 includes information usable by the identified STAs 104 to decode an associated EHT-SIG-B 370. EHT-SIG-A 368 may generally be used by a receiving device to interpret bits in EHT-SIG-B 370 or DATA field 376. For example, EHT-SIG-A 368 may indicate the locations and lengths of EHT-SIG-Bs 370 in the various component channels, available channel bandwidths, and modulation and coding schemes (MCSs), among other possibilities. EHT-SIG-A 368 may further include a cyclic redundancy check (CRC) (for example, four bits) and a tail (for example, 6 bits) that may be used for binary convolutional code (BCC).

EHT-SIG-B 370 may include multiple symbols that may be encoded in a different block from the block in which EHT-SIG-A 368 is encoded. In some other implementations, EHT-SIG-A 368 may be jointly encoded with some or all of EHT-SIG-B 370. For example, EHT-SIG-A 368 may be jointly encoded with a first portion of EHT-SIG-B 370 that includes information common to all users served by the PPDU 350. EHT-SIG-B 370 may carry STA-specific scheduling information such as, for example, per-user MCS values and per-user RU allocation information. EHT-SIG-B 370 may generally be used by a receiving device to interpret bits in the DATA field 376. In the context of DL MU-OFDMA, such information enables the respective STAs 104 to identify and decode corresponding RUs in the associated DATA field 376. Each EHT-SIG-B 370 includes a common field and at least one STA-specific ("user-specific") field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other possibilities. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields (which may be followed by padding). Each user block field may include, for example, two user fields that contain information for two respective STAs to decode their respective RU payloads.

Pre-SIG 366, and RL-SIG 364 if present, may indicate to EHT- or later version-compliant STAs 104 that the PPDU 350 is an EHT PPDU or a PPDU conforming to another non-legacy wireless communication protocol version. For example, Pre-SIG 366 may be used by a receiving device to interpret bits in one or more of EHT-SIG-A 368, EHT-SIG-B 370 or the DATA field 376. In some implementations, Pre-SIG 366 may include a reserved bit that indicates whether the PPDU 350 is, for example, compliant with EHT or a later version (for example, after IEEE 802.11ax) of the IEEE 802.11 family of wireless communication protocol standards or other standards. In some implementations, Pre-SIG 366 includes a version field that includes at least one bit indicating the particular wireless communication protocol version to which the PPDU 350 conforms.

Figure 4:
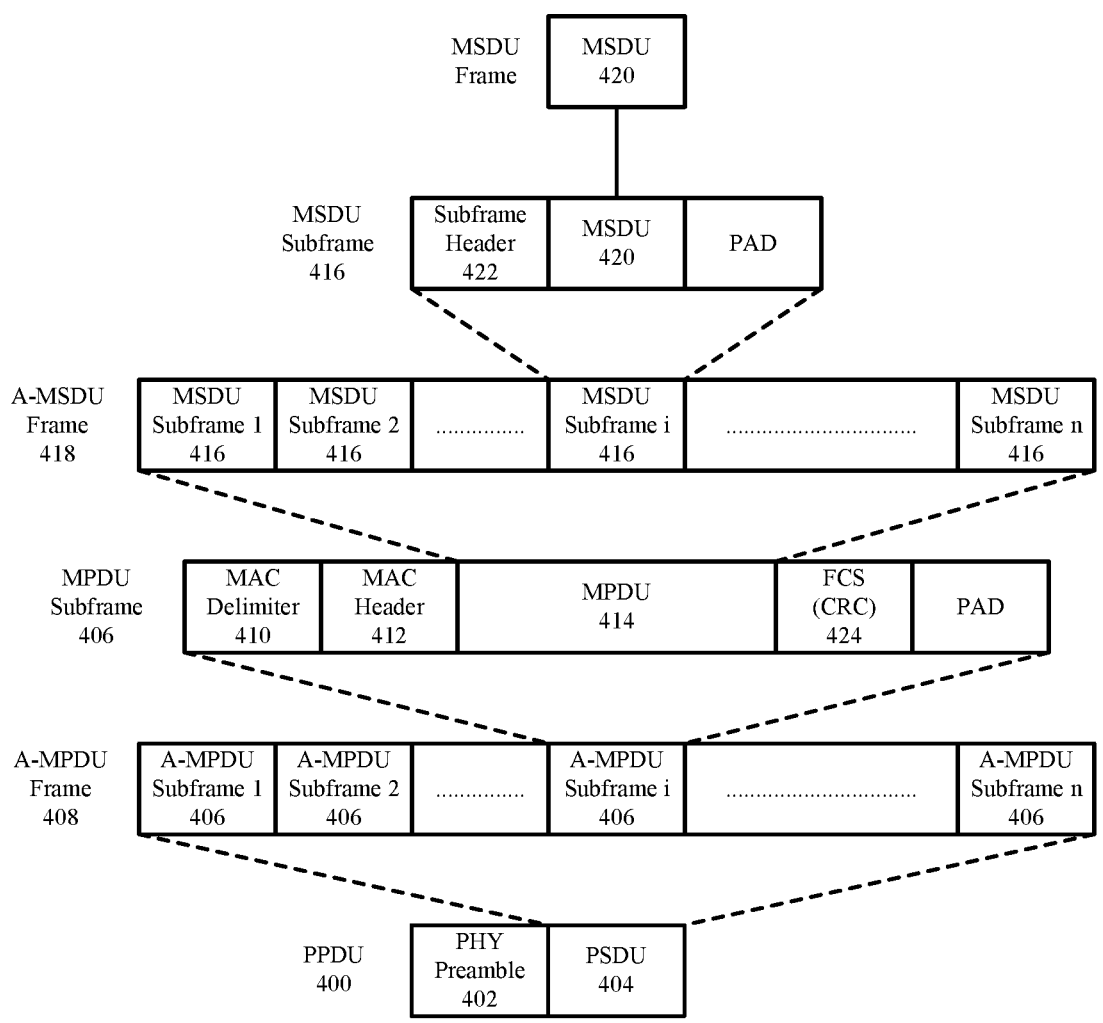
FIG. 4 shows an example physical layer convergence protocol (PLCP) protocol data unit (PPDU) usable for communications between an AP and a number of STAs.

FIG. 4 shows an example PPDU 400 usable for communications between an AP 102 and a number of STAs 104. As described above, each PPDU 400 includes a PHY preamble 402 and a PSDU 404. Each PSDU 404 may carry one or more MAC protocol data units (MPDUs). For example, each PSDU 404 may carry an aggregated MPDU (A-MPDU) 408 that includes an aggregation of multiple A-MPDU subframes 406. Each A-MPDU subframe 406 may include a MAC delimiter 410 and a MAC header 412 prior to the accompanying MPDU 414, which comprises the data portion ("payload" or "frame body") of the A-MPDU subframe 406. The MPDU 414 may carry one or more MAC service data unit (MSDU) subframes 416. For example, the MPDU 414 may carry an aggregated MSDU (A-MSDU) 418 including multiple MSDU subframes 416. Each MSDU subframe 416 contains a corresponding MSDU 420 preceded by a subframe header 422.

Referring back to the A-MPDU subframe 406, the MAC header 412 may include a number of fields containing information that defines or indicates characteristics or attributes of data encapsulated within the frame body 414. The MAC header 412 also includes a number of fields indicating addresses for the data encapsulated within the frame body 414. For example, the MAC header 412 may include a combination of a source address, a transmitter address, a receiver address or a destination address. The MAC header 412 may include a frame control field containing control information. The frame control field specifies the frame type, for example, a data frame, a control frame, or a management frame. The MAC header 412 may further including a duration field indicating a duration extending from the end of the PPDU until the end of an acknowledgment (ACK) of the last PPDU to be transmitted by the wireless communication device (for example, a block ACK (BA) in the case of an A-MPDU). The use of the duration field serves to reserve the wireless medium for the indicated duration, thus establishing the NAV. Each A-MPDU subframe 406 may also include a frame check sequence (FCS) field 424 for error detection. For example, the FCS field 416 may include a cyclic redundancy check (CRC).

As described above, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

APs and STAs that include multiple antennas may support various diversity schemes. For example, spatial diversity may be used by one or both of a transmitting device or a receiving device to increase the robustness of a transmission. For example, to implement a transmit diversity scheme, a transmitting device may transmit the same data redundantly over two or more antennas. APs and STAs that include multiple antennas may also support space-time block coding (STBC). With STBC, a transmitting device also transmits multiple copies of a data stream across a number of antennas to exploit the various received versions of the data to increase the likelihood of decoding the correct data. More specifically, the data stream to be transmitted is encoded in blocks, which are distributed among the spaced antennas and across time. Generally, STBC can be used when the number $N_{Tx}$ of transmit antennas exceeds the number $N_{SS}$ of spatial streams (described below). The $N_{SS}$ spatial streams may be mapped to a number $N_{STS}$ of space-time streams, which are then mapped to $N_{Tx}$ transmit chains.

APs and STAs that include multiple antennas may also support spatial multiplexing, which may be used to increase the spectral efficiency and the resultant throughput of a transmission. To implement spatial multiplexing, the transmitting device divides the data stream into a number $N_{SS}$ of separate, independent spatial streams. The spatial streams are then separately encoded and transmitted in parallel via the multiple $N_{Tx}$ transmit antennas. If the transmitting device includes $N_{Tx}$ transmit antennas and the receiving device includes $N_{Rx}$ receive antennas, the maximum number $N_{SS}$ of spatial streams that the transmitting device can simultaneously transmit to the receiving device is limited by the lesser of $N_{Tx}$ and $N_{Rx}$. In some implementations, the AP 102 and STAs 104 may be able to implement both transmit diversity as well as spatial multiplexing. For example, in instances in which the number $N_{SS}$ of spatial streams is less than the number $N_{Tx}$ of transmit antennas, the spatial streams may be multiplied by a spatial expansion matrix to achieve transmit diversity.

APs and STAs that include multiple antennas may also support beamforming. Beamforming refers to the focusing of the energy of a transmission in the direction of a target receiver. Beamforming may be used both in a single-user context, for example, to improve a signal-to-noise ratio (SNR), as well as in a multi-user (MU) context, for example, to enable MU multiple-input multiple-output (MIMO) (MU-MIMO) transmissions (also referred to as spatial division multiple access (SDMA)). To perform beamforming, a transmitting device, referred to as the beamformer, transmits a signal from each of multiple antennas. The beamformer configures the amplitudes and phase shifts between the signals transmitted from the different antennas such that the signals add constructively along particular directions towards the intended receiver, which is referred to as a beamformee. The manner in which the beamformer configures the amplitudes and phase shifts depends on channel state information (CSI) associated with the wireless channels over which the beamformer intends to communicate with the beamformee.

To obtain the CSI necessary for beamforming, the beamformer may perform a channel sounding procedure with the beamformee. For example, the beamformer may transmit one or more sounding signals (for example, in the form of a null data packet (NDP)) to the beamformee. The beamformee may then perform measurements for each of the $N_{Tx} \times N_{Rx}$ sub-channels corresponding to all of the transmit antenna and receive antenna pairs based on the sounding signal. The beamformee generates a feedback matrix based on the channel measurements and, typically, compresses the feedback matrix before transmitting the feedback to the beamformer. The beamformer may then generate a precoding (or "steering") matrix for the beamformee based on the feedback and use the steering matrix to precode the data streams to configure the amplitudes and phase shifts for subsequent transmissions to the beamformee.

As described above, a transmitting device may support the use of diversity schemes. When performing beamforming, the transmitting beamforming array gain is logarithmically proportional to the ratio of $N_{Tx}$ to $N_{SS}$. As such, it is generally desirable, within other constraints, to increase the number $N_{Tx}$ of transmit antennas when performing beamforming to increase the gain. It is also possible to more accurately direct transmissions by increasing the number of transmit antennas. This is especially advantageous in MU transmission contexts in which it is particularly important to reduce inter-user interference.

Figure 5:
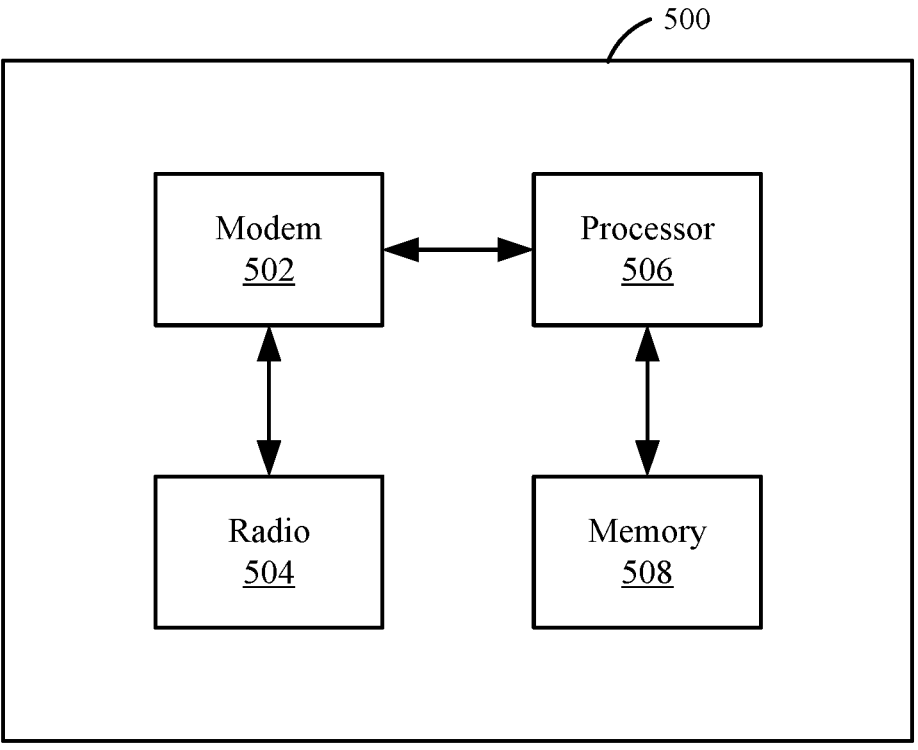
FIG. 5 shows a block diagram of an example wireless communication device.

FIG. 5 shows a block diagram of an example wireless communication device 500. In some implementations, the wireless communication device 500 can be an example of a device for use in a STA such as one of the STAs 104 described above with reference to FIG. 1. In some implementations, the wireless communication device 500 can be an example of a device for use in an AP such as the AP 102 described above with reference to FIG. 1. The wireless communication device 500 is capable of transmitting (or outputting for transmission) and receiving wireless communications (for example, in the form of wireless packets). For example, the wireless communication device can be configured to transmit and receive packets in the form of PPDUs and MPDUs conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 500 can be, or can include, a chip, system on chip (SoC), chipset, package or device that includes one or more modems 502, for example, a Wi-Fi (IEEE 802.11 compliant) modem. In some implementations, the one or more modems 502 (collectively "the modem 502") additionally include a WWAN modem (for example, a 3GPP 4G LTE or 5G compliant modem). In some implementations, the wireless communication device 500 also includes one or more radios 504 (collectively "the radio 504"). In some implementations, the wireless communication device 506 further includes one or more processors, processing blocks or processing elements 506 (collectively "the processor 506") and one or more memory blocks or elements 508 (collectively "the memory 508").

The modem 502 can include an intelligent hardware block or device such as, for example, an application-specific integrated circuit (ASIC) among other possibilities. The modem 502 is generally configured to implement a PHY layer. For example, the modem 502 is configured to modulate packets and to output the modulated packets to the radio 504 for transmission over the wireless medium. The modem 502 is similarly configured to obtain modulated packets received by the radio 504 and to demodulate the packets to provide demodulated packets. In addition to a modulator and a demodulator, the modem 502 may further include digital signal processing (DSP) circuitry, automatic gain control (AGC), a coder, a decoder, a multiplexer and a demultiplexer. For example, while in a transmission mode, data obtained from the processor 506 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 504. In implementations involving beamforming, the modulated symbols in the respective spatial streams are precoded via a steering matrix prior to their provision to the IFFT block.

While in a reception mode, digital signals received from the radio 504 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 506) for processing, evaluation or interpretation.

The radio 504 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 500 can include, or be coupled with, multiple transmit antennas (each with a corresponding transmit chain) and multiple receive antennas (each with a corresponding receive chain). The symbols output from the modem 502 are provided to the radio 504, which then transmits the symbols via the coupled antennas.

Similarly, symbols received via the antennas are obtained by the radio 504, which then provides the symbols to the modem 502.

The processor 506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 506 processes information received through the radio 504 and the modem 502, and processes information to be output through the modem 502 and the radio 504 for transmission through the wireless medium. For example, the processor 506 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 506 may generally control the modem 502 to cause the modem to perform various operations described above.

The memory 504 can include tangible storage media such as random-access memory (RAM) or read-only memory (ROM), or combinations thereof. The memory 504 also can store non-transitory processor- or computer-executable software (SW) code containing instructions that, when executed by the processor 506, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figures 6A, 6B:
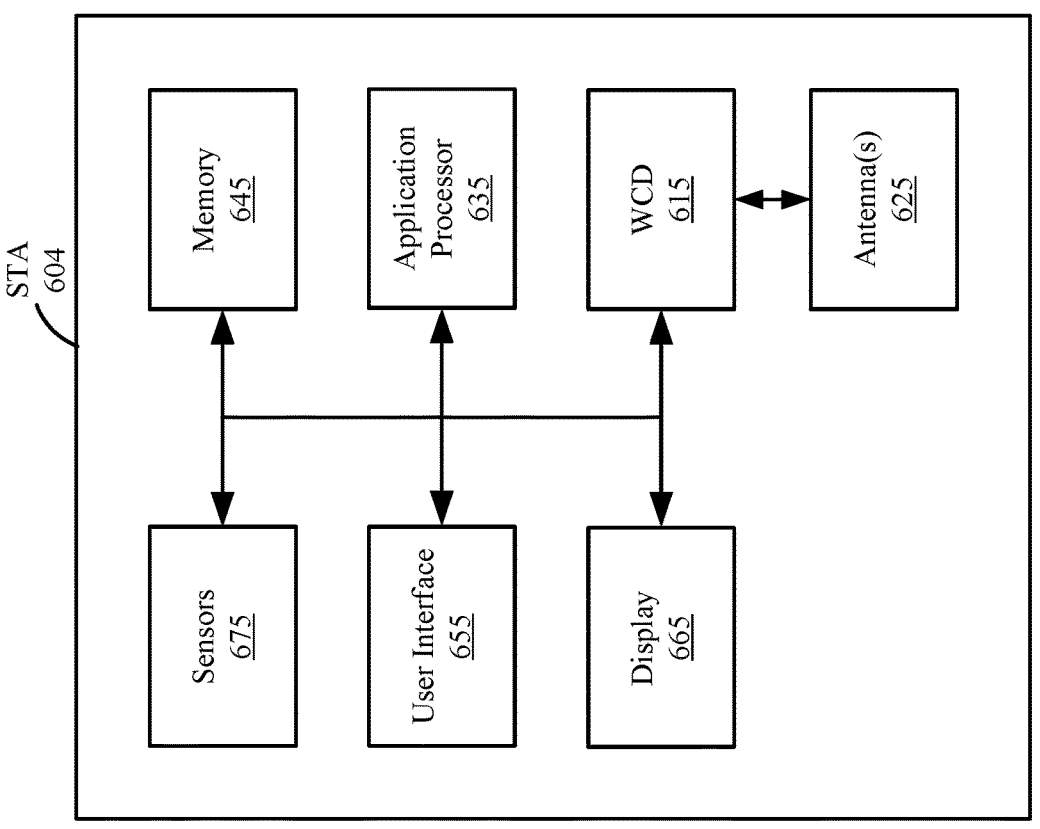
FIG. 6A shows a block diagram of an example access point (AP).
FIG. 6B shows a block diagram of an example station (STA).

FIG. 6A shows a block diagram of an example AP 602. For example, the AP 602 can be an example implementation of the AP 102 described with reference to FIG. 1. The AP 602 includes a wireless communication device (WCD) 610. For example, the wireless communication device 610 may be an example implementation of the wireless communication device 500 described with reference to FIG. 5. The AP 602 also includes multiple antennas 620 coupled with the wireless communication device 610 to transmit and receive wireless communications. In some implementations, the AP 602 additionally includes an application processor 630 coupled with the wireless communication device 610, and a memory 640 coupled with the application processor 630. The AP 602 further includes at least one external network interface 650 that enables the AP 602 to communicate with a core network or backhaul network to gain access to external networks including the Internet. For example, the external network interface 650 may include one or both of a wired (for example, Ethernet) network interface and a wireless network interface (such as a WWAN interface). Ones of the aforementioned components can communicate with other ones of the components directly or indirectly, over at least one bus. The AP 602 further includes a housing that encompasses the wireless communication device 610, the application processor 630, the memory 640, and at least portions of the antennas 620 and external network interface 650.

FIG. 6B shows a block diagram of an example STA 604. For example, the STA 604 can be an example implementation of the STA 104 described with reference to FIG. 1. The STA 604 includes a wireless communication device 615. For example, the wireless communication device 615 may be an example implementation of the wireless communication device 500 described with reference to FIG. 5. The STA 604 also includes one or more antennas 625 coupled with the wireless communication device 615 to transmit and receive wireless communications. The STA 604 additionally includes an application processor 635 coupled with the wireless communication device 615, and a memory 645 coupled with the application processor 635. In some implementations, the STA 604 further includes a user interface (UI) 655 (such as a touchscreen or keypad) and a display 665, which may be integrated with the UI 655 to form a touchscreen display. In some implementations, the STA 604 may further include one or more sensors 675 such as, for example, one or more inertial sensors, accelerometers, temperature sensors, pressure sensors, or altitude sensors. Ones of the aforementioned components can communicate with other ones of the components directly or indirectly, over at least one bus. The STA 604 further includes a housing that encompasses the wireless communication device 615, the application processor 635, the memory 645, and at least portions of the antennas 625, UI 655, and display 665.

As described above, link adaptation is a technique for adapting the modulation, coding, or other signaling parameters to the channel conditions on the wireless medium. In accordance with some link adaptation techniques, the transmitting device transmits sounding packets to the receiving device and the receiving device feeds back CSI to the transmitting device. The transmitting device then selects an MCS to be used for subsequent data transmissions to the receiving device based on the received CSI. An MCS defines a set of modulation and coding parameters to be used when transmitting signals over a wireless channel. Example parameters include coding rate, modulation type, and number of spatial streams. Example modulation types include, but are not limited to, binary phase shift keying (BPSK), quadrature phase shift keying (QPSK), and M-ary quadrature amplitude modulation (M-QAM). A modulation order describes the number of different or unique symbols that can be transmitted with a given modulation type. For example, BPSK has a modulation order of 2, QPSK has a modulation order of 4, and M-QAM can have various modulation orders (depending on the value of M).

In some implementations, a receiving device may generate the CSI by measuring a signal-to-interference-plus-noise ratio (SINR) of the wireless channel based on the received sounding packet. The SINR may be averaged over the bandwidth of the wireless channel at any suitable level of granularity (such as per bandwidth, per sub-band, per RU, per group of RUs, or per tone). Aspects of the present disclosure recognize that different modulation types tend to yield different SINRs under the same channel conditions. However, the linear average SINR does not indicate how the link will perform for a given modulation type. Further, the reported SINR is based on the transmitter configuration (such as number of spatial streams) and receiver type (such as MMSE or ML) implemented by the transmitting device and the receiving device, respectively, at the time the sounding packet is transmitted. However, the transmitter configuration or receiver type used to transmit and receive the sounding packet may be different than the transmitter configuration or receiver type used for subsequent communications between the transmitting device and the receiving device.

Various aspects relate generally to link adaptation in wireless communication systems, and more particularly, to transmitter-based modulation and coding scheme (MCS) selection. In some aspects, a transmitting device may transmit a test packet, such as a sounding packet, over a wireless channel to a receiving device. The receiving device may generate multiple signal-to-interference-plus-noise ratio (SINR) estimates for the wireless channel based on the received test packet. In some aspects, each SINR estimate may be associated with a particular respective modulation order selected from a set of multiple possible modulation orders (such as BPSK, QPSK, or M-QAM). In some other aspects, each SINR estimate may be generated based on a transmitter configuration (such as a number of spatial streams) or a receiver type (such as MMSE or ML) to be used by the transmitting device and the receiving device, respectively, for subsequent communications. The receiving device may then transmit feedback to the transmitting device that includes at least one of the SINR estimates associated with a particular respective modulation order. In some implementations, the receiving device may transmit multiple or all of the SINR estimates to the transmitting device. The transmitting device may then select an MCS to be used for subsequent communications with the receiving device based on the one or more SINR estimates and the respective modulation orders.

Particular implementations of the subject matter described in this disclosure can be implemented to realize one or more of the following potential advantages. In some implementations, the described techniques can be used to improve the data rate and throughput of communications over a wireless channel. By determining the modulation order associated with each SINR estimate reported by the receiving device, the transmitting device can make a more informed MCS selection based on the current channel conditions. For example, the transmitting device may select an MCS based on the reported SINR estimate and the associated modulation order that yields the largest throughput for the current channel conditions. Further, by adjusting the SINR estimates based on the transmitter configuration or receiver type to be used for subsequent communications (and not just at the time of channel sounding), the receiving device may ensure that the reported SINR estimates are relevant to the data transmission for which they are intended. Accordingly, aspects of the present disclosure enable the transmitting device to select an MCS that is more closely tailored for the channel conditions and device configurations at the time data is transmitted to the receiving device.

Figure 7:
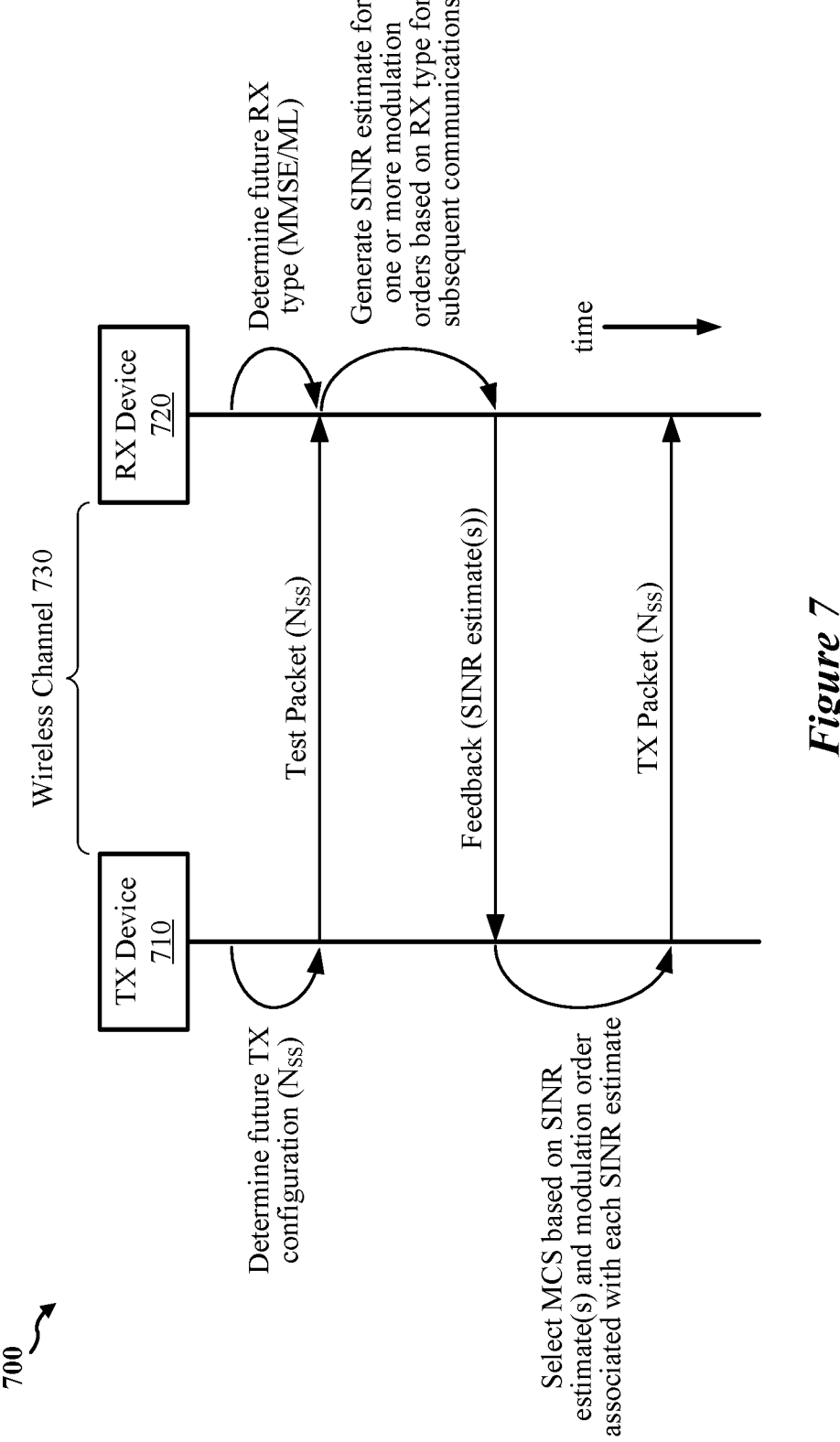
FIG. 7 shows a sequence diagram illustrating an example message exchange between a transmitting device and a receiving device according to some implementations.

FIG. 7 shows a sequence diagram illustrating an example message exchange 700 between a transmitting (TX) device 710 and a receiving (RX) device RX device 720, over a wireless channel 730, according to some implementations. In some implementations, the TX device 710 may be one example of the AP 102 of FIG. 1 or the AP 602 of FIG. 6A. In some other implementations, the TX device 710 may be one example of any of the STAs 104 of FIG. 1 or the STA 604 of FIG. 6B. In some implementations, the RX device 720 may be one example of the AP 102 of FIG. 1 or the AP 602 of FIG. 6A. In some other implementations, the RX device 720 may be one example of any of the STAs 104 of FIG. 1 or the STA 604 of FIG. 6B.

The TX device 710 determines a future transmitter (TX) configuration to be used for transmitting wireless signals to the RX device 720 following the transmission of a test packet. A TX configuration may include a number of spatial streams ($N_{SS}$) over which data is to be transmitted. Aspects of the present disclosure recognize that the TX configuration may affect the channel estimation performed by the RX device 720. For example, if the TX device 710 transmits a test packet over 4 spatial streams but will be using only 2 spatial streams for subsequent data transmissions to the RX device 720, the CSI reported back for 4 spatial streams may not accurately describe a wireless channel for 2-stream communications. In some implementations, the TX device 710 may transmit a test packet to the RX device 720 using the future TX configuration. For example, the TX device 710 may transmit the test packet using the same number of spatial streams ($N_{SS}$) that will be used for subsequent data transmissions to the RX device 720. In some aspects, the test packet may be sounding packet such as, for example, a null data packet (NDP).

The RX device 720 determines a future receiver (RX) type to be used for receiving wireless signals from the TX device 710 following the reception of a test packet. An RX type may include a minimum mean square error (MMSE) receiver type or a maximum likelihood (ML) receiver type. The RX type implemented by the RX device 720 at any given time may be governed by a state machine. The RX device 720 receives the test packet from the TX device 710 and generates feedback for the wireless channel 730 based at least in part on the received test packet. In some aspects, the feedback may include channel state information (CSI) associated with the wireless channel 730. For example, the RX device 720 may determine the characteristics of the wireless channel 730 (referred to as "channel estimation") based on one or more training fields (such as LTFs) included in the PHY preamble of the test packet.

In some implementations, the RX device 720 may generate one or more SINR estimates for the wireless channel 730. More specifically, each SINR estimate may be associated with a particular modulation order. For example, the RX device 720 may calculate a per-tone SINR for the wireless channel 730 based on the channel estimation. The per-tone SINR is a measure of the received signal strength, channel gain, interference, and noise on each tone (frequency subcarrier) of the wireless channel 730. The RX device 720 may then translate the per-tone SINR to a per-tone channel capacity. It is noted that the channel capacity generally increases as the SINR increases. However, because the maximum achievable data rate of any wireless communication is bounded by the modulation order, the channel capacity will saturate when the SINR exceeds a certain threshold. Thus, each modulation order will have a different constrained capacity curve. By taking the linear average of the per-tone channel capacity and mapping the average capacity to each constrained capacity curve, the RX device 720 may determine an "effective" SINR for each modulation order. The effective SINR is what the RX device 720 estimates the SINR to be for wireless transmissions of a given modulation order.

As described above, the RX type implemented by the RX device 720 may be governed by a state machine. In some instances, the RX type used to receive the test packet and estimate the SINR may be different than the RX type that the RX device 720 will use to receive subsequent transmissions from the TX device 710. Aspects of the present disclosure recognize that the RX type implemented by the RX device 720 may affect the SINR calculation. For example, if the RX device 720 receives the test packet and estimates SINR using an MMSE receiver type but will be using an ML receiver type to receive subsequent data transmissions from the TX device 710, the SINR perceived by the RX device 720 when receiving the test packet may not accurately describe the SINR that the RX device 720 will perceive when receiving the subsequent data transmissions. In some implementations, the RX device 720 may adjust the effective SNR values based, at least in part, on the future RX type. For example, the RX device 720 may predict or extrapolate the SINR associated with the future RX type based on the SINR associated with the RX type used to receive the test packet.

The RX device 720 reports the feedback, including one or more of the SINR estimates, back to the TX device 710. The RX device 720 may further provide an indication of the modulation order associated with each SINR estimate reported back to the TX device 710. In some implementations, the RX device 720 may report a single SINR estimate back to the TX device 710. For example, the feedback may include only the SINR estimate that leads to the highest throughput (referred to herein as the "optimal" SINR estimate) and information identifying the modulation order associated with the optimal SINR estimate. In some other implementations, the RX device 720 may report multiple SINR estimates back to the TX device 710. For example, the feedback may include the SINR estimate associated with each modulation order supported by the RX device 720. In some aspects, the feedback may include information identifying the modulation order associated with each SINR estimate. In some other aspects, the SINR estimates may be prearranged based on their associated modulation orders. For example, the SINR estimates may be arranged from lowest to highest (or highest to lowest) modulation order. Accordingly, the feedback may not include any additional information identifying the modulation order associated with each SINR estimate.

The TX device 710 receives the feedback from the RX device 720 and selects an MCS to be used for subsequent communications with the RX device 720 based, at least in part, on the SINR estimate(s) and the modulation order associated with each SINR estimate. For example, if the feedback includes only the optimal SINR estimate, the TX device 710 may select an MCS that conforms to the modulation order associated with the reported SINR estimate. Alternatively, if the feedback includes multiple SINR estimates, the TX device 710 may balance the effective SINR with the associated modulation order to achieve the highest throughput when selecting the MCS. For example, QPSK may be more robust against noise and interference but has lower spectral efficiency than 16-QAM. In contrast, 16-QAM may have twice the spectral efficiency but may require more retransmissions over noisy channels than QPSK.

The TX device 710 then transmits one or more packets (TX packets) to the RX device 720 using the selected MCS. As described above, the TX configuration ($N_{SS}$) used to transmit the TX packets may be the same as the TX configuration ($N_{SS}$) previously used to transmit the test packet. Accordingly, the selected MCS may be optimal for the channel conditions, TX configuration, and RX type associated with the transmission and reception of the TX packets.

Figure 8:
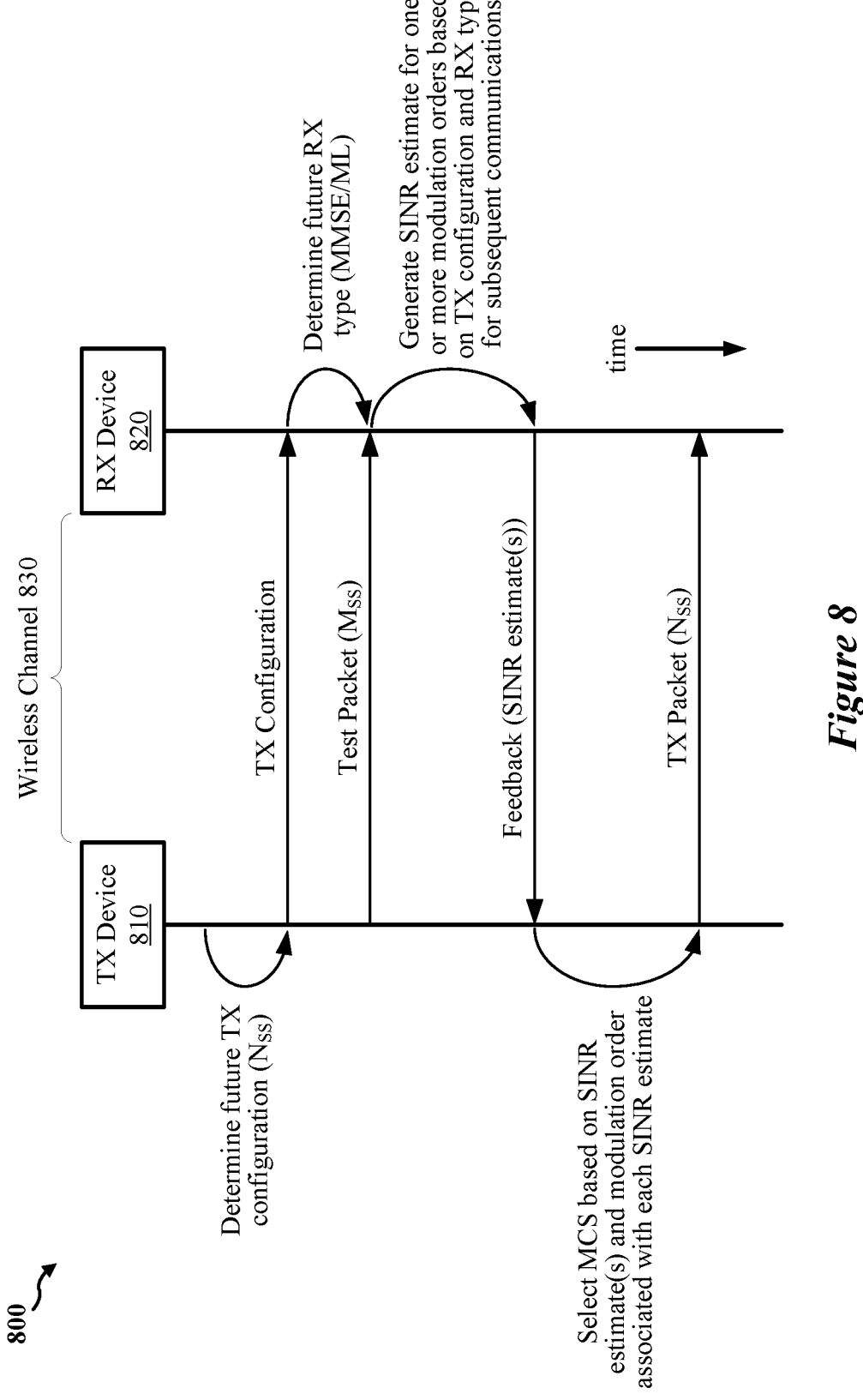
FIG. 8 shows a sequence diagram illustrating another example message exchange between a transmitting device and a receiving device according to some implementations.

FIG. 8 shows a sequence diagram illustrating another example message exchange 800 between a transmitting (TX) device 810 and a receiving (RX) device 820, over a wireless channel 830, according to some implementations. In some implementations, the TX device 810 may be one example of the AP 102 of FIG. 1 or the AP 602 of FIG. 6A. In some other implementations, the TX device 810 may be one example of any of the STAs 104 of FIG. 1 or the STA

604 of FIG. 6B. In some implementations, the RX device 820 may be one example of the AP 102 of FIG. 1 or the AP 602 of FIG. 6A. In some other implementations, the RX device 820 may be one example of any of the STAs 104 of FIG. 1 or the STA 604 of FIG. 6B.

The TX device 810 determines a future transmitter (TX) configuration to be used for transmitting wireless signals to the RX device 820 following the transmission of a test packet. In some implementations, the TX device 810 may indicate the future TX configuration to the RX device 820 prior to the transmission of a test packet. The TX device 810 may then transmit a test packet to the RX device 820 using any TX configuration. For example, the TX device 810 may transmit the test packet using a different number of spatial streams ($M_{SS}$) than will be used for subsequent data transmissions to the RX device 820. In some aspects, the test packet may be a sounding packet such as, for example, a null data packet (NDP) and the future TX configuration may be indicated in an NDP announcement (NDPA) preceding the transmission of the NDP.

The RX device 820 determines a future receiver (RX) type to be used for receiving wireless signals from the TX device 810 following the reception of a test packet. The RX type implemented by the RX device 820 at any given time may be governed by a state machine. The RX device 820 receives the test packet from the TX device 810 and generates feedback for the wireless channel 830 based at least in part on the received test packet. In some aspects, the feedback may include CSI associated with the wireless channel 830. In some implementations, the RX device 820 may generate one or more SINR estimates for the wireless channel 830. More specifically, each SINR estimate may correspond to an effective SINR associated with a particular modulation order. As described with respect to FIG. 7, the effective SINR is what the RX device 820 estimates the SINR to be for wireless transmissions of a given modulation order.

Aspects of the present disclosure recognize that the TX configuration and RX type may affect the SINR calculation by the RX device 820. For example, the SINR determined for a given combination of TX configuration and RX type may not accurately describe the SINR for a different combination of TX configuration and RX type. Further, the TX configuration or the RX type used to transmit and receive the test packet may be different than the future TX configuration or the future RX type, respectively. In some implementations, the RX device 820 may adjust the effective SNR values based, at least in part, on the future TX configuration and the future RX type. For example, the RX device 820 may predict or extrapolate the SINR associated with the future TX configuration and the future RX type based on the SINR estimated from the received test packet.

The RX device 820 reports the feedback, including one or more of the SINR estimates, back to the TX device 810. The RX device 820 may further provide an indication of the modulation order associated with each SINR estimate reported back to the TX device 810. In some implementations, the RX device 820 may report a single SINR estimate back to the TX device 810. In some other implementations, the RX device 820 may report multiple SINR estimates back to the TX device 810. In some aspects, the feedback may include information identifying the modulation order associated with each SINR estimate. In some other aspects, the SINR estimates may be prearranged based on their associated modulation orders. Accordingly, the feedback may not include any additional information identifying the modulation order associated with each SINR estimate.

The TX device 810 receives the feedback from the RX device 820 and selects an MCS to be used for subsequent communications with the RX device 820 based, at least in part, on the SINR estimate(s) and the modulation order associated with each SINR estimate. For example, if the feedback includes only the optimal SINR estimate, the TX device 810 may select an MCS that conforms to the modulation order associated with the reported SINR estimate. Alternatively, if the feedback includes multiple SINR estimates, the TX device 810 may balance the effective SINR with the associated modulation order to achieve the highest throughput when selecting the MCS.

The TX device 810 then transmits one or more packets (TX packets) to the RX device 820 using the selected MCS. As described above, the TX configuration ($N_{SS}$) used to transmit the TX packets may be different than the TX configuration ($M_{SS}$) previously used to transmit the test packet. However, because the RX device 820 adjusted the SINR estimates based on the future TX configuration, the selected MCS may be optimal for the channel conditions, TX configuration, and RX type associated with the transmission and reception of the TX packets.

FIG. 9 shows a flowchart illustrating an example process 900 for wireless communication that supports transmitter-based link adaptation according to some implementations. In some implementations, the process 900 may be performed by a wireless communication device operating as or within an AP, such as one of the APs 102, 602, 710, or 810 described above with reference to FIGS. 1, 6A, 7, and 8, respectively. In some other implementations, the process 900 may be performed by a wireless communication device operating as or within a network node, such as one of the STAs 104, 604, 720, or 820 described above with reference to FIGS. 1, 6B, 7, and 8, respectively.

In some implementations, the process 900 begins in block 902 with transmitting a first packet, over a wireless channel, to a receiving device. In block 904, the process 900 proceeds with receiving feedback from the receiving device responsive to the first packet, where the feedback includes one or more SINR estimates associated with the wireless channel. In block 906, the process 900 proceeds with determining a respective modulation order associated with each of the one or more SINR estimates. In some implementations, the feedback may include information indicating the modulation order associated with each of the one or more SINR estimates. In block 908, the process 900 proceeds with selecting an MCS to be used for subsequent communications with the receiving device based on the one or more SINR estimates and the respective modulation order associated with each of the one or more SINR estimates.

In some implementations, the one or more SINR estimates may include a plurality of SINR estimates, where each of the plurality of SINR estimates is associated with a different modulation order. In some implementations, the determining of the modulation order, in block 906, may include determining an arrangement of the plurality of SINR estimates in the received feedback, where the modulation order associated with each SINR estimate is determined based on the arrangement of the plurality of SINR estimates. In some implementations, the selecting of the MCS, in block 908, may include estimating a respective throughput of communications associated with each of the plurality of SINR estimates based on the modulation order associated with each SINR estimate, where the MCS is selected based on the estimated throughputs associated with the plurality of SINR estimates.

In some implementations, the process 900 may proceed, after the selection of the MCS in block 908, by transmitting a second packet to the receiving device in accordance with the selected MCS, where the second packet is transmitted over a number (N) of spatial streams. In some aspects, the first packet also may be transmitted over the N spatial streams. In some other aspects, the first packet may be transmitted over a different number (M) of spatial streams than the second packet. In some implementations, the process 900 may begin, prior to the transmission of the first packet in block 902, by transmitting a third packet to the receiving device, where the third packet carries information indicating the N spatial streams. In some implementations, the first packet may be an NDP and the third packet may be an NDPA associated with the NDP.

FIG. 10A shows a flowchart illustrating an example process 1000 for wireless communication that supports transmitter-based link adaptation according to some implementations. In some implementations, the process 1000 may be performed by a wireless communication device operating as or within a network node, such as one of the STAs 104, 604, 720, or 820 described above with reference to FIGS. 1, 6B, 7, and 8, respectively. In some other implementations, the process 1000 may be performed by a wireless communication device operating as or within an AP, such as one of the APs 102, 602, 710, or 810 described above with reference to FIGS. 1, 6A, 7, and 8, respectively.

In some implementations, the process 1000 begins in block 1002 with receiving a first packet, over a wireless channel, from a transmitting device. In block 1004, the process 1000 proceeds with determining a receiver type to be used for receiving subsequent communications from the transmitting device. In some implementations, the receiver type may be a minimum mean square error (MMSE) receiver type or a maximum likelihood (ML) receiver type. In block 1006, the process 1000 proceeds with generating one or more SINR estimates associated with the wireless channel based on the reception of the first packet and the receiver type to be used for receiving the subsequent communications. In block 1008, the process 1000 proceeds with transmitting, to the transmitting device, feedback including at least one of the one or more SINR estimates. In some implementations, the feedback may include information indicating a respective modulation order associated with each of the one or more SINR estimates.

In some implementations, the one or more SINR estimates may include a plurality of SINR estimates, where each of the plurality of SINR estimates is associated with a different modulation order. In some implementations, the process 1000 may proceed, prior to the transmission of the feedback in block 1008, by estimating a respective throughput of communications associated with each of the plurality of SINR estimates based on the modulation order associated with each SINR estimate; and selecting one of the plurality of SINR estimates to be included in the feedback based on the estimated throughput associated with each of the plurality of SINR estimates. In some implementations, the feedback may include the plurality of SINR estimates. In some implementations, the process 1000 may proceed, prior to the transmission of the feedback in block 1008, by arranging the plurality of SINR estimates, in the feedback, according to the modulation order associated with each SINR estimate.

In some implementations, the process 1000 may proceed, after the transmission of the feedback in block 1008, by receiving a second packet from the transmitting device prior to receiving the first packet, the second packet carrying information indicating a number of spatial streams associated with the subsequent communications; and adjusting each of the one or more SINR estimates based on the number of spatial streams associated with the subsequent communications. In some implementations, the first packet may be an NDP and the second packet may be an NDPA associated with the NDP.

FIG. 10B shows a flowchart illustrating an example process 1010 for wireless communication that supports transmitter-based link adaptation according to some implementations. In some implementations, the process 1010 may be performed by a wireless communication device operating as or within a network node, such as one of the STAs 104, 604, 720, or 820 described above with reference to FIGS. 1, 6B, 7, and 8, respectively. In some other implementations, the process 1010 may be performed by a wireless communication device operating as or within an AP, such as one of the APs 102, 602, 710, or 810 described above with reference to FIGS. 1, 6A, 7, and 8, respectively.

With reference for example to FIG. 10A, the process 1010 may be a more detailed implementation of the operation for generating the one or more SINR estimates described in block 1006 of the process 1000. For example, the process 1010 may begin, in block 1012, after the determination of the receiver type in block 1004 and before the transmission of the feedback in block 1008 of the process 1000. In some implementations, the process 1010 begins in block 1012 with determining a respective SINR for each of a plurality of tones of the wireless channel. In block 1014, the process 1000 proceeds with determining a respective channel capacity of each of the plurality of tones based on the determined SINR for each tone. In block 1016, the process 1010 proceeds with calculating a linear average of the determined channel capacities. In block 1018, the process 1010 proceeds with mapping the linear average to one or more constrained capacity curves associated with one or more modulation orders, respectively, where each of the one or more SINR estimates is determined based on the mapping of the linear average to a respective constrained capacity curve.

Figure 11:
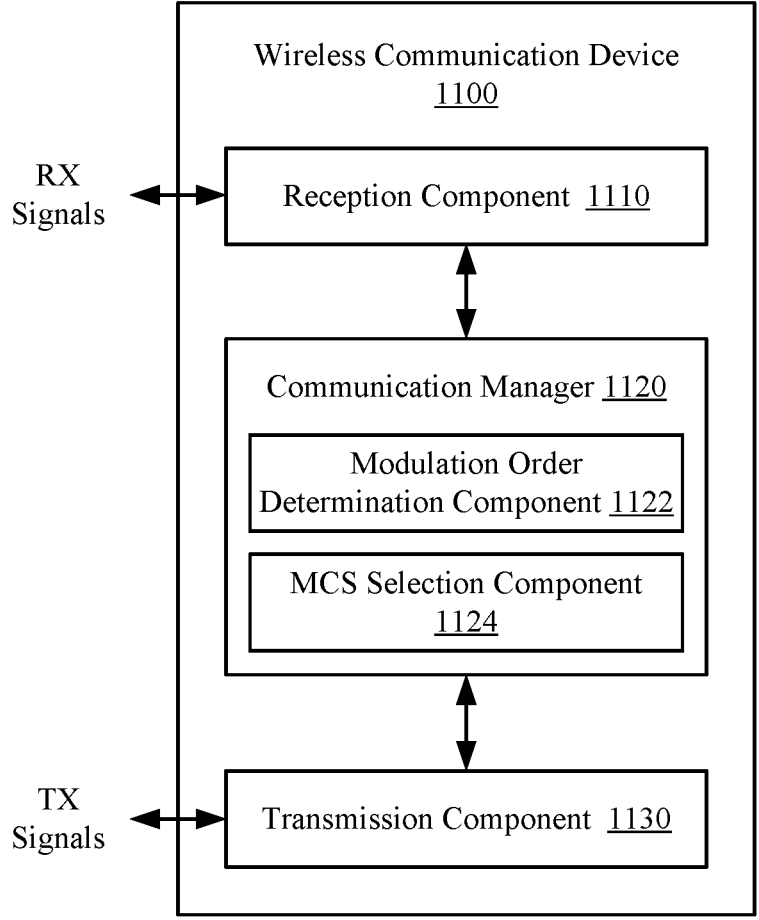
FIG. 11 shows a block diagram of an example wireless communication device according to some implementations.

FIG. 11 shows a block diagram of an example wireless communication device 1100 according to some implementations. In some implementations, the wireless communication device 1100 is configured to perform the process 900 described above with reference to FIG. 9. The wireless communication device 1100 can be an example implementation of the wireless communication device 500 described above with reference to FIG. 5. For example, the wireless communication device 1100 can be a chip, SoC, chipset, package or device that includes at least one processor and at least one modem (for example, a Wi-Fi (IEEE 802.11) modem or a cellular modem).

The wireless communication device 1100 includes a reception component 1110, a communication manager 1120, and a transmission component 1130. The communication manager 1120 further includes a modulation order determination component 1122 and an MCS selection component 1124. Portions of one or more of the components 1122 and 1124 may be implemented at least in part in hardware or firmware. In some implementations, at least some of the components 1122 or 1124 are implemented at least in part as software stored in a memory (such as the memory 508). For example, portions of one or more of the components 1122 and 1124 can be implemented as non-transitory instructions (or "code") executable by a processor (such as the processor 506) to perform the functions or operations of the respective component.

The reception component 1110 is configured to receive RX signals, over a wireless channel, from one or more other wireless communication devices. In some implementations, the RX signals may include feedback from a receiving device responsive to a first packet, where the feedback includes one or more SINR estimates associated with the wireless channel. The transmission component 1130 is configured to transmit TX signals to the one or more other wireless communication devices. In some implementations the TX signals may include the first packet that is transmitted to the receiving device. The communication manager 1120 is configured to control or manage communications with the one or more other wireless communication devices. In some implementations, the modulation order determination component 1122 may determine a respective modulation order associated with each of the one or more SINR estimates; and the MCS selection component 1124 may select an MCS to be used for subsequent communications with the receiving device based on the one or more SINR estimates and the respective modulation order associated with each of the one or more SINR estimates.

Figure 12:
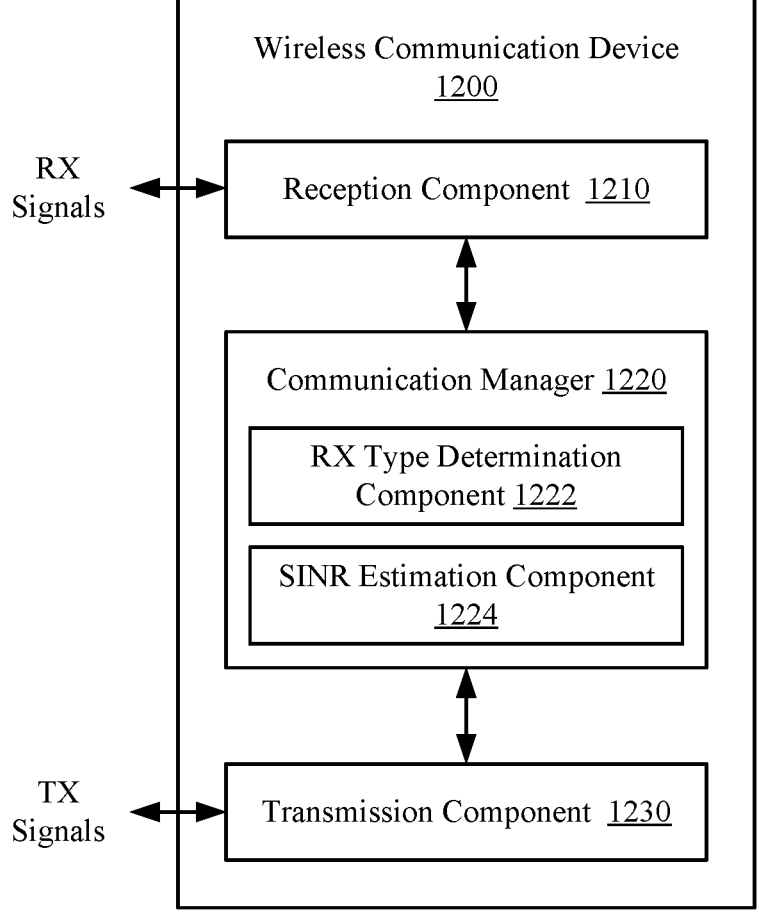
FIG. 12 shows a block diagram of an example wireless communication device according to some implementations.

FIG. 12 shows a block diagram of an example wireless communication device 1200 according to some implementations. In some implementations, the wireless communication device 1200 is configured to perform the processes 1000 described above with reference to FIG. 10. The wireless communication device 1100 can be an example implementation of the wireless communication device 500 described above with reference to FIG. 5. For example, the wireless communication device 1200 can be a chip, SoC, chipset, package or device that includes at least one processor and at least one modem (for example, a Wi-Fi (IEEE 802.11) modem or a cellular modem).

The wireless communication device 1200 includes a reception component 1210, a communication manager 1220, and a transmission component 1230. The communication manager 1220 further includes a receive (RX) type determination component 1222 and an SINR estimation component 1224. Portions of one or more of the components 1222 and 1224 may be implemented at least in part in hardware or firmware. In some implementations, at least some of the components 1222 or 1224 are implemented at least in part as software stored in a memory (such as the memory 508). For example, portions of one or more of the components 1222 and 1224 can be implemented as non-transitory instructions (or "code") executable by a processor (such as the processor 506) to perform the functions or operations of the respective component.

The reception component 1210 is configured to receive RX signals, over a wireless channel, from one or more other wireless communication devices. In some implementations, the RX signals may include a first packet received from a transmitting device. The transmission component 1230 is configured to transmit TX signals to the one or more other wireless communication devices. In some implementations, the TX signals may include feedback transmitted to the transmitting device in response to the first packet. The communication manager 1220 is configured to control or manage communications with the one or more other wireless communication devices. In some implementations, the RX type determination component 1222 may determine a receiver type to be used for receiving subsequent communications from the transmitting device; and the SINR estimation component 1224 may generate one or more SINR estimates associated with the wireless channel based on the reception of the first packet and the receiver type to be used for receiving the subsequent communications. In some implementations, at least one of the one or more SINR estimates may be included in the feedback transmitted to the transmitting device.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication performed by a wireless communication device associated with a wireless local area network (WLAN), comprising:

transmitting a first packet, over a wireless channel associated with the WLAN, to a receiving device associated with the WLAN;

receiving feedback from the receiving device responsive to the first packet, the feedback including one or more signal-to-interference-plus-noise ratio (SINR) estimates associated with the wireless channel, wherein the feedback further includes, for each SINR estimate of the one or more SINR estimates, an indication identifying, from among a plurality of modulation orders, which modulation order the each SINR estimate is calculated according to; and selecting a modulation and coding scheme (MCS) to be used for subsequent communications with the receiving device based on the one or more SINR estimates and the respective modulation order associated with each of the one or more SINR estimates.

2. The method of claim 1, further comprising:

transmitting a second packet to the receiving device in accordance with the selected MCS, the second packet being transmitted over a number (N) of spatial streams.

3. The method of claim 2, wherein the first packet is transmitted over the N spatial streams.

4. The method of claim 2, wherein the first packet is transmitted over a different number (M) of spatial streams than the second packet.

5. The method of claim 4, further comprising:

transmitting a third packet to the receiving device prior to the transmission of the first packet, the third packet carrying information indicating the N spatial streams.

6. The method of claim 5, wherein the first packet is a null data packet (NDP) and the third packet is an NDP announcement (NDPA) associated with the NDP.

7. The method of claim 1, wherein the one or more SINR estimates comprises a plurality of SINR estimates, each of the plurality of SINR estimates being associated with a different modulation order.

8. The method of claim 7, further comprising:

determining an arrangement of the plurality of SINR estimates in the received feedback, the respective modulation order associated with each SINR estimate being determined based on the arrangement of the plurality of SINR estimates.

9. The method of claim 7, wherein the selecting of the MCS comprises:

estimating a respective throughput of communications associated with each of the plurality of SINR estimates based on the respective modulation order upon which each SINR estimate is based at least in part, the MCS being selected based on the estimated throughputs associated with the plurality of SINR estimates.

10. A wireless communication device associated with a wireless local area network (WLAN), comprising:

at least one modem;

at least one processor communicatively coupled with the at least one modem; and at least one memory communicatively coupled with the at least one processor and storing processor-readable code that, when executed by the at least one processor in conjunction with the at least one modem, is configured to:

transmit a first packet, over a wireless channel associated with the WLAN, to a receiving device associated with the WLAN;

receive feedback from the receiving device responsive to the first packet, the feedback including one or more signal-to-interference-plus-noise ratio (SINR) estimates associated with the wireless channel, wherein the feedback further includes, for each SINR estimate of the one or more SINR estimates, an indication identifying, from among a plurality of modulation orders, which modulation order the each SINR estimate is calculated according to; and select a modulation and coding scheme (MCS) to be used for subsequent communications with the receiving device based on the one or more SINR estimates and the respective modulation order associated with each of the one or more SINR estimates.

11. The wireless communication device of claim 10, wherein execution of the processor-readable code is further configured to:

transmit a second packet to the receiving device in accordance with the selected MCS, the second packet being transmitted over a number (N) of spatial streams.

12. The wireless communication device of claim 11, wherein the first packet is transmitted over the N spatial streams.

13. The wireless communication device of claim 11, wherein the first packet is transmitted over a different number (M) of spatial streams than the second packet.

14. The wireless communication device of claim 13, wherein execution of the processor-readable code is further configured to:

transmit a third packet to the receiving device prior to the transmission of the first packet, the third packet carrying information indicating the N spatial streams.

15. The wireless communication device of claim 14, wherein the first packet is a null data packet (NDP) and the third packet is an NDP announcement (NDPA) associated with the NDP.

16. The wireless communication device of claim 10, wherein the one or more SINR estimates comprises a plurality of SINR estimates, each of the plurality of SINR estimates being associated with a different modulation order.

17. The wireless communication device of claim 16, wherein execution of the processor-readable code is further configured to:

determine an arrangement of the plurality of SINR estimates in the received feedback, the respective modulation order upon which each SINR estimate is based at least in part being determined based on the arrangement of the plurality of SINR estimates.

18. A method for wireless communication performed by a wireless communication device associated with a wireless local area network (WLAN), comprising:

receiving a first packet, over a wireless channel associated with the WLAN, from a transmitting device associated with the WLAN;

determining a receiver type to be used for receiving subsequent communications from the transmitting device;

generating one or more signal-to-interference-plus-noise ratio (SINR) estimates associated with the wireless channel based on the reception of the first packet and the receiver type to be used for receiving the subsequent communications; and transmitting, to the transmitting device, feedback including at least one of the one or more SINR estimates, wherein the feedback further includes, for each SINR estimate of the one or more SINR estimates, an indication identifying, from among a plurality of modulation orders, which modulation order the each SINR estimate is calculated according to.

* * * * *